(12) United States Patent
Klein et al.

(10) Patent No.: US 10,519,341 B2
(45) Date of Patent: Dec. 31, 2019

(54) NONAQUEOUS COATING MATERIAL COMPOSITIONS, COATINGS PRODUCED THEREFROM AND HAVING IMPROVED ADHESION AND SCRATCH RESISTANCE AND ALSO USE THEREOF

(71) Applicant: BASF Coatings GmbH, Muenster (DE)

(72) Inventors: Guenter Klein, Muenster (DE); Ulrike Wenking, Steinfurt-Borghorst (DE); Christian Weiher, Muenster (DE); Andreas Feigl, Drensteinfurt (DE)

(73) Assignee: BASF Coatings GmbH, Muenster (DE)

( * ) Notice: Subject to any disclaimer, the term of this patent is extended or adjusted under 35 U.S.C. 154(b) by 73 days.

(21) Appl. No.: 15/526,843

(22) PCT Filed: Nov. 30, 2015

(86) PCT No.: PCT/EP2015/078060
§ 371 (c)(1),
(2) Date: May 15, 2017

(87) PCT Pub. No.: WO2016/091638
PCT Pub. Date: Jun. 16, 2016

(65) Prior Publication Data
US 2017/0355875 A1    Dec. 14, 2017

(30) Foreign Application Priority Data
Dec. 8, 2014 (EP) .................................... 14196777

(51) Int. Cl.
C09D 175/16 (2006.01)
C08G 18/62 (2006.01)
C08G 18/75 (2006.01)
C08G 18/79 (2006.01)
C08G 18/80 (2006.01)
C08G 18/08 (2006.01)
C09D 175/04 (2006.01)

(52) U.S. Cl.
CPC ....... *C09D 175/16* (2013.01); *C08G 18/0852* (2013.01); *C08G 18/6229* (2013.01); *C08G 18/755* (2013.01); *C08G 18/791* (2013.01); *C08G 18/792* (2013.01); *C08G 18/808* (2013.01); *C08G 18/809* (2013.01); *C08G 18/8064* (2013.01); *C08G 18/8087* (2013.01); *C09D 175/04* (2013.01)

(58) Field of Classification Search
None
See application file for complete search history.

(56) References Cited

U.S. PATENT DOCUMENTS

| | | | | |
|---|---|---|---|---|
| 4,598,131 A | 7/1986 | Prucnal | | |
| 4,710,542 A | 12/1987 | Forgione et al. | | |
| 5,597,874 A * | 1/1997 | Anton | ........................ | C08F 8/30 525/160 |
| 5,605,956 A * | 2/1997 | Anton | .................. | C08G 65/007 524/539 |
| 5,627,238 A * | 5/1997 | Anton | ................ | C08G 18/6229 524/590 |
| 6,492,482 B2* | 12/2002 | Lomoelder | .......... | C08G 18/809 524/589 |
| 6,632,856 B2* | 10/2003 | Chen | ..................... | B22C 1/2273 523/139 |
| 7,718,264 B2* | 5/2010 | Klun | .................. | C08G 18/3825 428/421 |
| 8,609,742 B2* | 12/2013 | Wakita | .................. | C08F 283/12 522/97 |
| 8,728,623 B2* | 5/2014 | Pokorny | .................... | C09J 7/29 428/411.1 |
| 2003/0027921 A1* | 2/2003 | Speier | .................. | C08G 18/289 524/589 |

(Continued)

FOREIGN PATENT DOCUMENTS

CN 103517931 1/2014
DE 10 2005 045 228 A1 4/2007

(Continued)

OTHER PUBLICATIONS

International Preliminary Report on Patentability dated Jun. 22, 2017 in EP2015/078060 filed Nov. 30, 2015 (with partial English translation).
International Search Report and Written Opinion of the International Searching Authority dated Feb. 2, 2016 in PCT/EP2015/078060 (with English translation).
B. Singh, et al., "Carbamylmethylated Melamines Novel Crosslinkers for the Coatings Industry" Advanced Organic coatings Science and Technology Series, vol. 13, 1991, pp. 193-207.
U.S. Appl. No. 15/526,852, filed May 15, 2017, Guenter Klein.
International Search Report dated Feb. 2, 2016 in PCT/EP2015/078060 filed Nov. 30, 2015.

*Primary Examiner* — Robert S Loewe
(74) *Attorney, Agent, or Firm* — Oblon, McClelland, Maier & Neustadt, L.L.P.

(57) ABSTRACT

A nonaqueous coating material composition and a coating produced from the coating material composition are provided. The coating material composition contains at least one polyhydroxyl group-containing component, at least one polyisocyanate group-containing component, at least one catalyst, and at least one urethane additive (PF) which has specific groups. The urethane additive (PF) is prepared by reacting 0.5 to 20 mol % of the isocyanate groups originally present in a polyisocyanate (PI) with a component (Ia) and 10 to 99.5 mol % of the isocyanate groups originally present in the polyisocyanate (PI) with a component (IIa). The component (Ia) contains at least one perfluoroalkyl group of a specific formula and one group reactive toward the isocyanate groups. The component (IIa) contains at least one silane group of a specific formula and one group reactive toward the isocyanate groups.

15 Claims, No Drawings

(56) References Cited

U.S. PATENT DOCUMENTS

| | | | |
|---|---|---|---|
| 2004/0181008 A1* | 9/2004 | Hanazawa | C08G 18/2885 524/589 |
| 2005/0054804 A1* | 3/2005 | Dams | C08G 18/3228 528/44 |
| 2005/0064202 A1 | 3/2005 | Graham et al. | |
| 2005/0121644 A1* | 6/2005 | Dams | C08G 18/2835 252/8.62 |
| 2005/0238899 A1* | 10/2005 | Nagata | C08G 18/289 428/480 |
| 2007/0032627 A1* | 2/2007 | Burleigh | C08G 18/0866 528/60 |
| 2008/0131595 A1 | 6/2008 | Graham et al. | |
| 2009/0198000 A1* | 8/2009 | Weinelt | C09D 4/00 524/188 |
| 2010/0028544 A1* | 2/2010 | Groenewolt | C08G 18/289 427/384 |
| 2011/0008628 A1* | 1/2011 | Fujita | C08G 18/0823 428/425.8 |
| 2011/0045190 A1* | 2/2011 | Groenewolt | C08G 18/1883 427/385.5 |

FOREIGN PATENT DOCUMENTS

| | | |
|---|---|---|
| EP | 0 245 700 B1 | 8/1994 |
| EP | 0 692 007 | 1/1996 |
| EP | 0 994 117 A1 | 4/2000 |
| EP | 1 273 640 A2 | 1/2003 |
| EP | 1 664 222 B1 | 1/2012 |
| EP | 2 886 208 A1 | 6/2015 |
| EP | 2 886 574 A1 | 6/2015 |
| JP | 2007-505742 A | 3/2007 |
| WO | 01/09260 A1 | 2/2001 |
| WO | 2006/042585 A1 | 4/2006 |
| WO | 2007/137632 A1 | 12/2007 |
| WO | 2008/040428 A2 | 4/2008 |
| WO | 2008/074489 A1 | 6/2008 |
| WO | 2008/074490 A1 | 6/2008 |
| WO | 2008/074491 A1 | 6/2008 |
| WO | 2009/077181 A1 | 6/2009 |
| WO | 2010/149236 A1 | 12/2010 |
| WO | 2013/081892 A1 | 6/2013 |

* cited by examiner

NONAQUEOUS COATING MATERIAL COMPOSITIONS, COATINGS PRODUCED THEREFROM AND HAVING IMPROVED ADHESION AND SCRATCH RESISTANCE AND ALSO USE THEREOF

The present invention relates to nonaqueous coating material compositions comprising at least one polyhydroxyl group-containing component (A) and at least one polyisocyanate group-containing component (B). A further subject of the present invention are the coatings produced from these coating material compositions, and also their use, particularly for automotive OEM finishing, automotive refinish, and the coating not only of parts for installation in or on vehicles, but also of plastics.

In a typical multicoat paint system in automotive OEM finishing, a substrate coated with an electrocoat system is coated further with a surfacer coat, a basecoat, and a clearcoat. Clearcoat materials used may be 2-component (2K) clearcoat materials, for example. A clearcoat is a coating material which, after application and curing, forms a transparent coating (the clearcoat) having protective and/or decorative properties. Protective properties are, for example, scratch resistance and weathering resistance, especially UV resistance. A decorative property is, for example, good gloss. In automotive OEM finishing there may be overbaking of the resultant multicoat paint system. The term "overbaking" refers to the alteration of the surface of the finish as a result of local overheating. Overbaking results in a deterioration, in particular, in the adhesion properties of the resulting clearcoat surface, which affects, for example, refinishing or window bonding. Overbaking may occur in two scenarios:

The body is baked a number of times at the recommended temperature (e.g., 3 times at 135° C. for 20 minutes each).

The body (or individual components) are baked above the recommended baking temperature.

The adhesion of the clearcoat is often improved through the addition of corresponding additives, especially silane-based additives. Hence it is known from WO 07/137632 that the adhesion, particularly for window bonding on automobile clearcoats, can be improved by addition of silanized isocyanates as adhesion promoters and of diphosphonic diesters as catalyst.

Furthermore, EP-B-1 664 222 discloses coating materials, in particular automotive clearcoats, which comprise as binders 10 to 90 wt %, preferably 40 to 80 wt %, of fluorinated silane polymers and preferably a polyhydroxyl group-containing binder component and also a polyisocyanate cross-linking agent. The fluorinated silane polymers are obtained in particular by polymerization of ethylenically unsaturated monomers having silane groups, ethylenically unsaturated monomers having fluorine functionality, and further comonomers. According to that specification, the adhesion of the resulting coating to subsequent coatings, which is frequently impaired through the use of such fluorinated silane polymers, is improved by the addition of specific fluorinated urethane additives. These fluorinated urethane additives are prepared by first reacting 0.45 to 1.0 equivalent of the isocyanate groups of diisocyanates and polyisocyanates with a fluorinated monoalcohol, and subsequently reacting any residual isocyanate groups still present with a polyoxyethylene/polyoxypropylene glycol or with an amino-functional silane.

WO 2013/081892 discloses coating materials which comprise a polyhydroxyl group-containing binder component and a crosslinker having isocyanate groups and having fluoroether groups, the fluoroether content of the coating materials being between 0.1 and 3.0 wt %, based on the resin solids content of the coating material. The crosslinkers in that case are produced by reaction of polyisocyanates with fluorine-containing polyether polyols which have at least one —$OCH_2C_nF_{2n+1}$ group, where n is 1 or 2. These coating materials are used as clearcoat material for producing multicoat paint systems, in the automobile finishing segment, for example, and lead to coatings which are easy to clean and have a reduced soiling tendency. Moreover, the resulting coatings exhibited good optical properties, good appearance, and high gloss.

Furthermore, the as yet unpublished European patent application EP 2013197704.3 and the as yet unpublished European patent application EP 2013197695.3 describe reaction products of isocyanatofunctional silanes with alpha, omega-hydroxy-functionalized oligoesters and their use as adhesion promoters in coating materials, more particularly solventborne surfacers and solventborne clearcoats.

Lastly, WO 08/74491, WO 08/74490, WO 08/74489, WO 09/077181, and WO 10/149236 disclose coating materials wherein the isocyanate and silane group-containing compound (B) used is based on known isocyanates, preferably on the biuret dimers and isocyanurate trimers of diisocyanates, more particularly of hexamethylene diisocyanate. Relative to conventional polyurethane coating materials, these coating material compositions have the advantage of significantly improved scratch resistance in conjunction with good weathering stability. In need of improvement with these coating materials is the soiling tendency of the resulting coatings. There is also a desire for the provision of clearcoat surfaces which are very easy to clean and which are often also referred to as an "easy-to-clean surface".

PROBLEM

A problem addressed by the present invention was therefore that of providing nonaqueous coating material compositions that lead to coatings, in particular clearcoat films, with improved adhesion. An improvement in the adhesion properties is to be achieved, particularly after overbaking, for refinishing and for window bonding. At the same time, moreover, the basic formula of a conventional clearcoat system is to be altered as little as possible.

Furthermore, the change should not adversely affect the protective and decorative properties of the clearcoat material, such as the micropenetration hardness. In particular, the coatings and paint systems, especially the clearcoat systems, ought to be able to be produced even at coat thicknesses >40 µm without stress cracks occurring. The coating materials, furthermore, ought to meet the requirements typically imposed on the clearcoat films in automotive OEM finishes and automotive refinishes.

Lastly, the new coating materials ought to be able to be produced easily and very reproducibly, and ought not to give rise to any environmental problems during coatings application.

SOLUTION

In the light of the statement of problem above, nonaqueous coating material compositions have been found, comprising at least one polyhydroxyl group-containing component (A),
at least one polyisocyanate group-containing component (B),
at least one catalyst (D)
and at least one urethane additive (PF) which is different from component (B) and which has at least one perfluoroalkyl group of the formula (I)

where
R$^1$ and R$^2$ independently of one another are H, F and/or CF$_3$, but wherein R$^1$ and R$^2$ may not both be H, and
x is 1 to 20, preferably 3 to 11, more preferably 5 to 7, and
at least one silane group of the formula (II)

where
G is identical or different hydrolyzable groups, preferably halogen, more particularly chlorine and bromine, alkoxy group, alkylcarbonyl group and/or acyloxy group, more preferably alkoxy group,
X is organic radical, more particularly linear and/or branched alkylene or cycloalkylene radical having 1 to 20 carbon atoms, very preferably alkylene radical having 1 to 4 carbon atoms,
R$^3$ is alkyl, cycloalkyl, aryl, or aralkyl, it being possible for the carbon chain to be interrupted by nonadjacent oxygen, sulfur, or NRa groups, where Ra is alkyl, cycloalkyl, aryl or aralkyl, R$^3$ preferably being alkyl radical, more particularly having 1 to 6 C atoms,
s is 0 to 2, preferably 0 to 1, more preferably 0,
wherein the urethane additive (PF) has been prepared by reaction of
0.5 to 20 mol % of the isocyanate groups originally present in at least one polyisocyanate (PI) with a component (Ia) which is different from component (IIa) and which has at least one perfluoroalkyl group of the formula (I) and one group that is reactive toward isocyanate groups, and
10.0 to 99.5 mol % of the isocyanate groups originally present in the polyisocyanate (PI) with a component (IIa) which is different from component (Ia) and which has at least one silane group of the formula (II) and one group that is reactive toward isocyanate groups.

A further subject of the present invention are multistage coating methods using these coating material compositions, and also the use of the coating material compositions as clearcoat or application of the coating method for automotive OEM finishing, automotive refinish, and/or the coating of parts for installation in or on automobiles, of plastics substrates and/or of utility vehicles.

It has now surprisingly been found that the addition of the urethane additives (PF) employed in accordance with the invention significantly improves the adhesion of the clearcoat, especially in the event of overbaking, without significantly detracting from the other, good properties of the coating, more particularly its micropenetration hardness.

Furthermore, the coating material compositions also meet the requirements typically imposed on the clearcoat film in automotive OEM finishes and automotive refinishes. In particular, the coatings and paint systems, especially the clearcoat systems, can be produced even at film thicknesses >40 μm without stress cracks occurring. Lastly, the coating material compositions can be produced easily and with very good reproducibility.

DESCRIPTION OF THE INVENTION

The Inventive Coating Materials

For the purposes of the present invention, unless otherwise indicated, constant conditions were selected in each case for the determination of nonvolatile fractions (NVF, solids). To determine the nonvolatile fraction, an amount of 1 g of the respective sample is applied to a solid lid and heated at 130° C. for 1 h, then cooled to room temperature and weighed again (in accordance with ISO 3251). Determinations were made of the nonvolatile fraction of, for example, corresponding polymer solutions and/or resins present in the coating composition of the invention, in order thereby to be able to adjust, for example, the weight fraction of the respective constituent in a mixture of two or more constituents, or of the overall coating composition, and allow it to be determined.

The binder fraction (also called nonvolatile fraction or solids content) of the individual components (A) or (B) or (C) or (E) of the coating material is therefore determined by weighing out a small sample of the respective component (A) or (B) or (C) or (E) and subsequently determining the solids by drying it at 130° C. for 60 minutes, cooling it, and then weighing it again. The binder fraction of the component in wt % is then given, accordingly, by 100 multiplied by the ratio of the weight of the residue of the respective sample after drying at 130° C., divided by the weight of the respective sample prior to drying.

In the case of standard commercial components, the binder fraction of said component may also be equated with sufficient accuracy with the stated solids content, unless otherwise indicated.

The binder fraction (also called nonvolatile fraction or solids content) of the urethane additive (PF) is determined arithmetically from the fraction of the individual compounds (I-a), (II-a), and optionally (III-a) used in its preparation, and also from the polyisocyanate (PI).

The binder fraction of the coating material composition is determined arithmetically from the sum of the binder fractions of the individual binder components and crosslinker components (A), (B), (C), (PF) and (E) of the coating material.

For the purposes of the invention, the hydroxyl number or OH number indicates the amount of potassium hydroxide, in milligrams, which is equivalent to the molar amount of acetic acid bound during the acetylation of one gram of the constituent in question. For the purposes of the present invention, unless otherwise indicated, the hydroxyl number is determined experimentally by titration in accordance with DIN 53240-2 (Determination of hydroxyl value—Part 2: Method with catalyst).

For the purposes of the invention, the acid number indicates the amount of potassium hydroxide, in milligrams, which is needed to neutralize 1 g of the respective constituent. For the purposes of the present invention, unless otherwise indicated, the acid number is determined experimentally by titration in accordance with DIN EN ISO 2114.

The mass-average (Mw) and number-average (Mn) molecular weight is determined for the purposes of the present invention by means of gel permeation chromatography at 35° C., using a high-performance liquid chromatography pump and a refractive index detector. The eluent used was tetrahydrofuran containing 0.1 vol % acetic acid, with an elution rate of 1 ml/min. The calibration is carried out by means of polystyrene standards.

For the purposes of the invention, the glass transition temperature Tg is determined experimentally on the basis of DIN 51005 "Thermal Analysis (TA)—Terms" and DIN 53765 "Thermal Analysis—Differential Scanning Calorimetry (DSC)". This involves weighing out a 10 mg sample into a sample boat and introducing it into a DSC instrument. The instrument is cooled to the start temperature, after which a 1$^{st}$ and 2$^{nd}$ measurement run is carried out under inert gas flushing (N$_2$) at 50 ml/min with a heating rate of 10 K/min, with cooling to the start temperature again between the measurement runs. Measurement takes place typically in the temperature range from about 50° C. lower than the expected glass transition temperature to about 50° C. higher than the glass transition temperature. The glass transition temperature recorded for the purposes of the present invention, in line with DIN 53765, section 8.1, is the temperature in the 2$^{nd}$ measurement run at which half of the change in the specific heat capacity (0.5 delta cp) is reached. This temperature is determined from the DSC plot (plot of the thermal flow against the temperature), and is the temperature at the point of intersection of the midline between the extrapolated baselines, before and after the glass transition, with the measurement plot.

The Polyhydroxyl Group-Containing Component (A)

As polyhydroxyl group-containing component (A) it is possible to use all compounds known to the skilled person which have at least 2 hydroxyl groups per molecule and are oligomeric and/or polymeric. As component (A) it is also possible to use mixtures of different oligomeric and/or polymeric polyols.

The preferred oligomeric and/or polymeric polyols (A) have number-average molecular weights Mn>=300 g/mol, preferably Mn=400–30 000 g/mol, more preferably Mn=500–15 000 g/mol, and mass-average molecular weights Mw>500 g/mol, preferably between 800 and 100 000 g/mol, more particularly between 900 and 50 000 g/mol, measured by means of gel permeation chromatography (GPC) against a polystyrene standard.

Preferred as component (A) are polyester polyols, polyacrylate polyols and/or polymethacrylate polyols, and also copolymers thereof—referred to hereinafter as polyacrylate polyols; polyurethane polyols, polysiloxane polyols, and mixtures of these polyols.

The polyols (A) preferably have an OH number of 30 to 400 mg KOH/g, more particularly between 70 and 250 mg KOH/g. In the case of the poly(meth)acrylate copolymers, the OH number may also be determined with sufficient precision by calculation on the basis of the OH-functional monomers employed.

The polyols (A) preferably have an acid number of between 0 and 30 mg KOH/g.

The glass transition temperatures, measured by means of DSC measurements in accordance with DIN-EN-ISO 11357-2, of the polyols are preferably between −150 and 100° C., more preferably between −40° C. and 60° C.

Polyurethane polyols are prepared preferably by reaction of oligomeric polyols, more particularly of polyester polyol prepolymers, with suitable di- or polyisocyanates, and are described in EP-A-1 273 640, for example. Use is made more particularly of reaction products of polyester polyols with aliphatic and/or cycloaliphatic di- and/or polyisocyanates. The polyurethane polyols used with preference in accordance with the invention have a number-average molecular weight Mn>=300 g/mol, preferably Mn=700–2000 g/mol, more preferably Mn=700–1300 g/mol, and also preferably a mass-average molecular weight Mw>500 g/mol, preferably between 1500 and 3000 g/mol, more particularly between 1500 and 2700 g/mol, in each case measured by means of gel permeation chromatography (GPC) against a polystyrene standard.

Suitable polysiloxane polyols are described in WO-A-01/09260, for example, and the polysiloxane polyols recited therein can be employed preferably in combination with further polyols, more particularly those having higher glass transition temperatures.

As polyhydroxyl group-containing component (A), use is made with particular preference of polyester polyols which are different from the urethane additive (PF), polyacrylate polyols, polymethacrylate polyols, and polyurethane polyols, or mixtures thereof, and very preferably of mixtures of poly(meth)acrylate polyols.

The polyester polyols (A) used with preference in accordance with the invention have a number-average molecular weight Mn>=300 g/mol, preferably Mn=400–10 000 g/mol, more preferably Mn=500–5000 g/mol, and also preferably a mass-average molecular weight Mw>500 g/mol, preferably between 800 and 50 000 g/mol, more particularly between 900 and 10 000 g/mol, in each case measured by means of gel permeation chromatography (GPC) against a polystyrene standard.

The polyester polyols (A) used with preference in accordance with the invention preferably have an OH number of 30 to 400 mg KOH/g, more particularly between 100 and 250 mg KOH/g.

The polyester polyols (A) used with preference in accordance with the invention preferably have an acid number of between 0 and 30 mg KOH/g.

Suitable polyester polyols are also described in EP-A-0 994 117 and EP-A-1 273 640, for example.

The poly(meth)acrylate polyols (A) used with preference in accordance with the invention are generally copolymers and preferably have a number-average molecular weight Mn>=300 g/mol, preferably Mn=500–15 000 g/mol, more preferably Mn=900–10 000 g/mol, and also, preferably, mass-average molecular weights Mw between 500 and 20 000 g/mol, more particularly between 1000 and 15 000 g/mol, measured in each case by means of gel permeation chromatography (GPC) against a polystyrene standard.

The glass transition temperature of the copolymers is generally between −100 and 100° C., more particularly between −40 and <60° C. (measured by means of DSC measurements in accordance with DIN-EN-ISO 11357-2).

The poly(meth)acrylate polyols (A) preferably have an OH number of 60 to 300 mg KOH/g, more particularly between 70 and 250 mg KOH/g, and an acid number of between 0 and 30 mg KOH/g. The hydroxyl number (OH number) and the acid number are determined as described above (DIN 53240-2 and DIN EN ISO 2114, respectively).

Hydroxyl group-containing monomer building blocks used are preferably hydroxyalkyl acrylates and/or hydroxyalkyl methacrylates, such as, more particularly, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, and also, in particular, 4-hydroxybutyl acrylate and/or 4-hydroxybutyl methacrylate.

Further monomer building blocks used for the poly(meth) acrylate polyols are preferably alkyl acrylates and/or alkyl methacrylates, such as, preferably, ethyl acrylate, ethyl methacrylate, propyl acrylate, propyl methacrylate, isopropyl acrylate, isopropyl methacrylate, butyl acrylate, butyl meth-acrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl meth-acrylate, 3,3,5-trimethylhexyl acrylate, 3,3,5-tri-methylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate, or, in particular, cyclohexyl acrylate and/or cyclohexyl methacrylate.

As further monomer building blocks for the poly(meth)acrylate polyols it is possible to use vinylaromatic hydrocarbons, such as vinyltoluene, alpha-methylstyrene, or, in particular, styrene, amides or nitriles of acrylic or methacrylic acid, vinyl esters or vinyl ethers, and also, in minor amounts, in particular, acrylic acid and/or methacrylic acid.

The Polyisocyanate Group-Containing Component (B)

Suitability as component (B) is possessed by conventional substituted or unsubstituted, aromatic, aliphatic, cycloaliphatic and/or heterocyclic polyisocyanates, preferably aliphatic and/or cycloaliphatic polyisocyanates. Examples of preferred polyisocyanates are the following: toluene 2,4-diisocyanate, toluene 2,6-diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, dodecane 1,12-diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g., Desmodur® W from Bayer AG), tetramethylxylyl diisocyanates (e.g., TMXDI® from American Cyanamid), and mixtures of the aforementioned polyisocyanates. Preferred polyisocyanates are also the biuret dimers and the isocyanurate trimers of the aforementioned diisocyanates. Particularly preferred polyisocyanates (B) are hexamethylene 1,6-diisocyanate, isophorone diisocyanate, and 4,4'-methylenedicyclohexyl diisocyanate, their biuret dimers and/or their isocyanurate trimers, and/or the asymmetric trimers thereof, such as, for example, the asymmetric HDI trimer available commercially under the name Desmodur® N3900.

In a further embodiment of the invention, suitability as component (B) is possessed by polyisocyanate prepolymers having urethane structural units, which are obtained by reaction of polyols with a stoichiometric excess of aforementioned polyisocyanates. Such polyisocyanate prepolymers are described in U.S. Pat. No. 4,598,131, for example.

Component (B) may be present in a suitable solvent (L). Suitable solvents (L) are those which permit sufficient solubility of the polyisocyanate component and are free from groups reactive toward isocyanates. Examples of such solvents are acetone, methyl ethyl ketone, cyclohexanone, methyl isobutyl ketone, methyl isoamyl ketone, diisobutyl ketone, ethyl acetate, n-butyl acetate, ethylene glycol diacetate, butyrolactone, diethyl carbonate, propylene carbonate, ethylene carbonate, N,N-dimethylformamide, N,N-dimethyl-acetamide, N-methylpyrrolidone, N-ethylpyrrolidone, methylal, butylal, 1,3-dioxolane, glycerol formal, benzene, toluene, xylene, n-hexane, cyclohexane, Solventnaphtha®, 2-methoxypropyl acetate (MPA), and ethyl ethoxypropionate.

The Hydroxyl Group-Containing component (C)

Apart from the polyhydroxyl group-containing component (A), the coating material compositions of the invention may optionally further comprise one or more monomeric, hydroxyl group-containing components (C) that are different from component (A) and the urethane additive (PF). These components (C) preferably account for a fraction of 0 to 10 wt %, more preferably of 0 to 5 wt %, based in each case on the binder fraction of the coating material composition (in other words based in each case on the total of the binder fraction of the component (A) plus the binder fraction of the component (B) plus the binder fraction of the component (C) plus the binder fraction of the component (PF) plus the binder fraction of the component (E)).

Low molecular mass polyols are employed as hydroxyl group-containing component (C). Low molecular mass polyols used are, for example, diols, such as preferably ethylene glycol, di- and tri-ethylene glycol, neopentyl glycol, 1,2-propanediol, 2,2-dimethyl-1,3-propanediol, 1,4-butanediol, 1,3-butanediol, 1,5-pentanediol, 2,2,4-trimethyl-1,3-pentanediol, 1,6-hexanediol, 1,4-cyclohexanedimethanol, and 1,2-cyclohexanedimethanol, and also polyols, such as preferably trimethylolethane, trimethylolpropane, trimethylolhexane, 1,2,4-butanetriol, pentaerythritol, and dipentaerythritol. Such low molecular mass polyols (C) are preferably admixed in minor fractions to the polyol component (A).

The Catalyst (D)

Catalysts which can be used for the crosslinking of the alkoxysilyl units and also for the reaction between the hydroxyl groups of the compound (A) and the isocyanate groups of the compound (B) are compounds which are known per se. Examples are Lewis acids (electron-deficient compounds), such as tin naphthenate, tin benzoate, tin octoate, tin butyrate, dibutyltin dilaurate, dibutyltin diacetate, dibutyltin oxide, and lead octoate, for example, and also catalysts as described in WO-A-2006/042585. Also suitable, furthermore, are customary acid-based catalysts, such as, for example, dodecylbenzenesulfonic acid, toluenesulfonic acid, and the like. Catalysts used for the crosslinking of the alkoxysilyl units are preferably amine adducts of phosphoric acid or of sulfonic acid (e.g., Nacure products from King Industries).

Employed with particular preference as catalyst (D) are phosphorus-containing catalysts, more particularly phosphorus- and nitrogen-containing catalysts. In this context it is also possible to use mixtures of two or more different catalysts (D).

Examples of suitable phosphorus-containing catalysts (D) are substituted phosphonic diesters and diphosphonic diesters, preferably from the group consisting of acyclic phosphonic diesters, cyclic phosphonic diesters, acyclic diphosphonic diesters and cyclic diphosphonic diesters. Catalysts of this kind are described in, for example, German patent application DE-A-102005045228.

More particularly, however, substituted phosphoric monoesters and phosphoric diesters are used, preferably from the group consisting of acyclic phosphoric monoesters, cyclic phosphoric monoesters, acyclic phosphoric diesters, and cyclic phosphoric diesters, more preferably amine adducts of phosphoric monoesters and diesters.

Employed with very particular preference as catalyst (D) are the corresponding amine-blocked phosphoric esters, including, in particular, amine-blocked ethylhexyl phosphates and amine-blocked phenyl phosphates, very preferably amine-blocked bis(2-ethylhexyl) phosphate.

Examples of amines with which the phosphoric esters are blocked are, in particular, tertiary amines, examples being bicyclic amines, such as diazabicyclooctane (DABCO), diazabicyclononene (DBN), diazabicycloundecene (DBU), dimethyldodecylamine, or triethylamine, for example. Used with particular preference for blocking the phosphoric esters are tertiary amines, which ensure high activity of the catalyst under the curing conditions of 140° C. Used with very particular preference in particular at low curing temperatures of not more than 80° C. to block the phosphoric esters are bicyclic amines, especially diazabicyclooctane (DABCO). Certain amine-blocked phosphoric acid catalysts are also available commercially (e.g., Nacure products from King Industries). An example which may be given is that known under the name Nacure 4167 from King Industries, as a particularly suitable catalyst, based on an amine-blocked partial ester of phosphoric acid.

The catalysts are used preferably in fractions of 0.01 to 20 wt %, more preferably in fractions of 0.1 to 10 wt %, based on the binder fraction of the coating material composition of the invention. A lesser activity on the part of the catalyst may be partly compensated by correspondingly higher quantities employed.

The coating material compositions of the invention may further comprise an additional amine catalyst based on a bicyclic amine, more particularly an unsaturated bicyclic amine. Examples of suitable amine catalysts are 1,5-diazabicyclo[4.3.0]non-5-ene or 1,8-diazabicyclo[5.4.0]undec-7-ene.

These amine catalysts are employed preferably in fractions of 0.01 to 20 wt %, more preferably in fractions of 0.1 to 10 wt %, based on the binder fraction of the coating material composition of the invention. The binder fraction of the coating material composition is determined arithmetically from the sum of the binder fractions of the individual binder and crosslinker components (A), (B), (PF), (C), and (E) of the coating material.

The Urethane Additive (PF)

It is essential to the invention that the coating material composition comprises at least one urethane additive (PF) which is different from components (A), (B), and (C) and which has
at least one perfluoroalkyl group of the formula (I)

$$CR^1{}_3-(CR^2{}_2)_x- \qquad (I),$$

where
$R^1$ and $R^2$ independently of one another are H, F and/or $CF_3$, but $R^1$ and $R^2$ must not simultaneously be H, and
x is 1 to 20, preferably 3 to 11, more preferably 5 to 7, and
at least one silane group of the formula (II)

$$-X-Si-R^3{}_sG_{3-s} \qquad (II)$$

where
G is identical or different hydrolyzable groups, preferably halogen, more particularly chlorine and bromine, alkoxy group, alkylcarbonyl group and/or acyloxy group, more particularly alkoxy group (O $R^5$),
X is organic radical, more particularly linear and/or branched alkylene or cycloalkylene radical having 1 to 20 carbon atoms, very preferably alkylene radical having 1 to 4 carbon atoms,
$R^3$ is alkyl, cycloalkyl, aryl, or aralkyl, it being possible for the carbon chain to be interrupted by nonadjacent oxygen, sulfur, or NRa groups, where Ra is alkyl, cycloalkyl, aryl, or aralkyl, $R^3$ preferably being alkyl radical, more particularly having 1 to 6 C atoms, and
s is 0 to 2, preferably 0 to 1, more preferably 0,
where the urethane additive (PF) has been prepared by reaction of
0.5 to 20 mol % of the isocyanate groups originally present in at least one polyisocyanate (PI) with a component (Ia) which is different from component (IIa) and which has at least one perfluoroalkyl group of the formula (I) and one group that is reactive toward isocyanate groups, and
10 to 99.5 mol % of the isocyanate groups originally present in the polyisocyanate (PI) with a component (IIa) which is different from component (Ia) and which has at least one silane group of the formula (II) and one group that is reactive toward isocyanate groups.

The urethane additive (PF) has preferably been prepared by reaction of at least some of the originally present isocyanate groups in the polyisocyanate (PI) not only with components (Ia) and (IIa) but also, additionally, of some of the originally present isocyanate groups in the polyisocyanate (PI) with a monofunctional component (IIIa) which is different from components (Ia) and (IIa) and which is reactive toward isocyanate groups.

With particular preference, therefore, the urethane additive (PF) has been prepared by reaction of
0.5 to 20 mol % of the isocyanate groups originally present in the polyisocyanate (PI) with a component (Ia),
30 to 98.5 mol % of the isocyanate groups originally present in the polyisocyanate (PI) with a component (IIa), and
1 to 69.5 mol % of the isocyanate groups originally present in the polyisocyanate (PI) with a monofunctional component (IIIc) which is different from components (Ia) and (IIa) and which is reactive toward isocyanate groups.

With very particular preference the urethane additive (PF) has been prepared by reaction of
1.0 to 16.0 mol %, preferably 1.5 to 10 mol %, of the isocyanate groups originally present in the polyisocyanate (PI) with a component (Ia),
64 to 89.0 mol %, preferably 66 to 86 mol %, of the isocyanate groups originally present in the polyisocyanate (PI) with a component (IIa), and
10 to 30 mol %, preferably 12.5 to 25.0 mol %, of the isocyanate groups originally present in the polyisocyanate (PI) with a component (IIIa).

Suitability as polyisocyanate (PI) is possessed by the conventional substituted or unsubstituted aromatic, aliphatic, cycloaliphatic and/or heterocyclic di- and/or polyisocyanates already listed in connection with the description of component (B). Preferred polyisocyanates (PI) are substituted or unsubstituted aliphatic and/or cycloaliphatic di- and/or polyisocyanates. Preferred polyisocyanates are also the biuret dimers and the isocyanurate trimers of the aforementioned diisocyanates. Particularly preferred polyisocyanates (B) are tetramethylene 1,4-diisocyanate, hexamethylene 1,6-diisocyanate, 2,2,4-trimethylhexane 1,6-diisocyanate, ethylene diisocyanate, 1,12-dodecane diisocyanate, isophorone diisocyanate, 4,4'-methylenedicyclohexyl diisocyanate, and mixtures of the aforementioned polyisocyanates, and also of the polyisocyanates and/or asymmetric trimers thereof that are derived from such polyisocyanates by trimerization, dimerization, urethane formation, biuret formation, uretdione formation and/or allophanate formation, such as, for example, the asymmetric HDI trimer available commercially under the name Desmodur® N3900, more particularly of the biurets and/or of the allophanates and/or of the isocyanurates of such polyisocyanates. Especially preferred are hexamethylene 1,6-diisocyanate, isophorone diisocyanate, and 4,4'-methylenedicyclohexyl diisocyanate, their biuret dimers and/or their isocyanurate trimers.

It is essential to the invention that the urethane additive (PF) has at least one silane group of the formula (II). The structure of these silane radicals (II) as well affects the reactivity and hence also the very substantial reaction during the curing of the coating. With regard to the compatibility and the reactivity of the silanes, silanes having 3 hydrolyzable groups are employed with preference, i.e., s is 0.

The hydrolyzable groups G may be selected from the group of the halogens, more particularly chlorine and bromine, from the group of the alkoxy groups, from the group of the alkylcarbonyl groups, and from the group of the acyloxy groups, more particularly from the alkoxy groups. Particularly preferred are alkoxy groups (OR$^5$) where R$^5$ is hydrogen, alkyl, or cycloalkyl, it being possible for the carbon chain to be interrupted by nonadjacent oxygen, sulfur, or NRa groups, where Ra is alkyl, cycloalkyl, aryl, or aralkyl, with R$^5$ and R$^{5'}$ preferably being ethyl and/or methyl, more preferably methyl.

The structural units (II) are introduced preferably by reaction of—preferably aliphatic—polyisocyanates and/or the polyisocyanates derived therefrom by trimerization, dimerization, urethane formation, biuret formation, uretdione formation and/or allophanate formation with at least one amino-functional silane of the formula (IIa-1)

$$H—NR^4{}_t—[X—Si—R^3{}_sG_{3-s}]_{2-t} \quad (\text{IIa-1}),$$

where X, R$^3$, G, and s have the definition given for formula (II), R$^4$ is hydrogen, alkyl, cycloalkyl, aryl or aralkyl, it being possible for the carbon chain to be interrupted by nonadjacent oxygen, sulfur, or NRa groups, where Ra is alkyl, cycloalkyl, aryl or aralkyl, and t is 0 or 1.

Suitability is possessed for example by primary aminosilanes, such as 3-aminopropyltriethoxysilane (available, for example, under the brand name Geniosil® GF 93 from Wacker Chemie), 3-aminopropyltrimethoxysilane (available, for example, under the brand name Geniosil® GF 96 from Wacker Chemie), N-(2-aminoethyl)-3-aminopropyltrimethoxysilane (available, for example, under the brand name Geniosil® GF 9 and also Geniosil® GF 91 from Wacker Chemie), N-(2-aminoethyl)-3-amino-propylmethyl-dimethoxysilane (available, for example, under the brand name Geniosil® GF 95 from Wacker Chemie), or secondary N-alkylaminosilanes, such as N-(3-(trimethoxysilyl)propyl) butylamine, or bisalkoxy-silylamines, such as bis(3-propyltrimethoxysilyl)amine, for example.

The structural units (II) are introduced preferably by reaction of—preferably aliphatic—polyisocyanates and/or the polyisocyanates (PI) derived therefrom by trimerization, dimerization, urethane formation, biuret formation, uretdione formation and/or allophanate formation with a mixture of at least one compound of the formula (IIa-2) and at least one compound of the formula (IIa):

$$H—NR^4—(X—SiR^3{}_s(OR^5)_{3-s}) \quad (I)$$

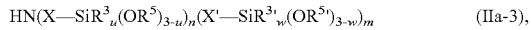

$$HN(X—SiR^3{}_u(OR^5)_{3-u})_n(X'—SiR^{3'}{}_w(OR^{5'})_{3-w})_m \quad (\text{IIa-3})$$

where R$^3$, R$^4$, and s have the definition given for formula (IIa-1), R$^5$ and R$^{5'}$ are hydrogen, alkyl, or cycloalkyl, it being possible for the carbon chain to be interrupted by a nonadjacent oxygen, sulfur, or NRa groups, where Ra is alkyl, cycloalkyl, aryl, or aralkyl, R$^5$ and R$^{5'}$ preferably being ethyl and/or methyl, more preferably methyl, X and X' are linear and/or branched alkylene or cycloalkylene radical having 1 to 20 carbon atoms, preferably alkylene radical having 1 to 4 carbon atoms, n is 0 to 2, m is 0 to 2, m+n is 2, and u and w are 0 to 2.

The respective preferred alkoxy radicals (OR$^5$) and (OR$^{5'}$) may be identical or different, but for the construction of the radicals the critical factor is the extent to which these radicals influence the reactivity of the hydrolyzable silane groups. R$^5$ and R$^{5'}$ are preferably each an alkyl radical, more particularly having 1 to 6 C atoms. Particularly preferred radicals are those which raise the reactivity of the silane groups, i.e., which represent good leaving groups. Accordingly, a methoxy radical is preferred over an ethoxy radical, which is in turn preferred over a propoxy radical. With particular preference, therefore, R$^5$ is ethyl and/or methyl, more particularly methyl.

The reactivity of organofunctional silanes may further be influenced considerably by the length of the spacers X and X' between silane functionality and organic functional group which serves for reaction with the constituent that is to be modified. An example of this are the "alpha" silanes available from Wacker, in which there is a methylene group between Si atom and functional group, rather than the propylene group that is present in the case of "gamma" silanes.

Compounds (IIa-3) preferred in accordance with the invention are bis(2-ethyltrimethoxysilyl)amine, bis(3-propyltrimethoxysilyl)amine, bis(4-butyltrimethoxy-silyl) amine, bis(2-ethyltriethoxysilyl)amine, bis(3-propyltriethoxysilyl)amine and/or bis(4-butyltriethoxy-silyl)amine. Especially preferred is bis(3-propyl-trimethoxysilyl)amine. Such aminosilanes are available for example under the brand name DYNASYLAN® from DEGUSSA or Silquest® from OSI.

Compounds (IIa-2) preferred in accordance with the invention are aminoalkyltrialkoxysilanes, such as preferably 2-aminoethyltrimethoxysilane, 2-aminoethyl-triethoxysilane, 3-aminopropyltrimethoxysilane, 3-aminopropyltriethoxysilane, 4-aminobutyltrimethoxy-silane, and 4-aminobutyltriethoxysilane. Particularly preferred compounds (IIa-2) are N-(2-(trimethoxy-silyl)ethyl)alkylamines, N-(3-(trimethoxysilyl)propyl)-alkylamines, N-(4-(trimethoxysilyl)butyl)alkylamines, N-(2-(triethoxysilyl)ethyl)alkylamines, N-(3-(tri-ethoxysilyl)propyl)alkylamines and/or N-(4-(triethoxy-silyl)butyl)alkylamines. Especially preferred is N-(3-(trimethoxysilyl)propyl)butylamine. Such amino-silanes are available for example under the brand name DYNASYLAN® from DEGUSSA or Silquest® from OSI.

With particular preference the urethane additive (PF) has been prepared using as component (IIa) a mixture of 100 to 5 mol %, preferably 100 to 10 mol %, more preferably 100 to 20 mol %, very preferably 100 to 40 mol %, based in each case on the total amount of the compounds (IIa-2) plus (IIa-3), of at least one compound of the formula (IIa-2), and 0 to 95 mol %, preferably 0 to 90 mol %, more preferably to 80 mol %, very preferably 0 to 60 mol %, based in each case on the total amount of the compounds (IIa-2) plus (IIa-3), of at least one compound of the formula (IIa-3).

Moreover, the urethane additive (PF) has preferably been prepared by the component (Ia), used for preparing the urethane additive (PF), being a fluoroalcohol of the formula (Ia-1)

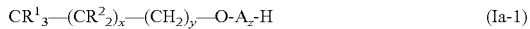

$$CR^1{}_3—(CR^2{}_2)_x—(CH_2)_y—O-A_z-H \quad (\text{Ia-1})$$

where
R$^1$ and R$^2$ independently of one another are H, F and/or CF$_3$, but R$^1$ and R$^2$ may not both be H,
x is 1 to 20, preferably 3 to 11, more preferably 5 to 7,
y is 1–6,
z is 0–100, preferably 0,
A is CR'R''—CR'''R''''—O or (CR'R'')$_a$—O or CO—(CR'R'')$_b$ —O,
R', R'', R''', and R'''' independently of one another are H, alkyl, cycloalkyl, aryl, or any organic radical having 1 to 25 C atoms,
a and b are 3–5.

In particular, the polyalkylene oxide structural unit $A_z$ comprises homopolymers, copolymers, or block polymers of any desired alkylene oxides, or comprises polyoxyalkylene glycols, or comprises polylactones.

Examples of compounds suitable as perfluoroalkyl alcohols (Ia-1) are the (per)fluoroalkyl alcohols described in WO 2008/040428, page 33, line 4 to page 34, line 3, and also the (per)fluoroalkyl alcohols described in EP-B-1 664 222 B1, page 9, paragraph [0054], to page 10, paragraph [57], for example.

Component (PF) preferably has at least one perfluoroalkyl group of the formula (I-2) and/or of the formula (I-3)

$$CF_3(CF_2)_k— \qquad (I-2)$$

$$F(CF_2CF_2)_l— \qquad (I-3)$$

where
k is 1 to 20, preferably 3 to 11, more preferably 5 to 7,
l is 1 to 8, preferably 1 to 6, more preferably 2 to 3.

The structural units (I-2) are introduced preferably by reaction of—preferably aliphatic—polyisocyanates and/or the polyisocyanates derived therefrom by trimerization, dimerization, urethane formation, biuret formation, uretdione formation and/or allophanate formation with at least one (per)fluoroalkyl monoalcohol (FA) of the formula (I-2a):

$$CF_3—(CF_2)_k—(CH_2)_o—O—H \qquad (I-2a)$$

where k is 1 to 20, preferably 3 to 11, more preferably 5 to 7, and o is 1 to 10, preferably 1 to 4.

The structural units (I-3) are introduced preferably by reaction of—preferably aliphatic—polyisocyanates and/or the polyisocyanates derived therefrom by trimerization, dimerization, urethane formation, biuret formation, uretdione formation and/or allophanate formation with at least one (per)fluoroalkyl monoalcohol (FA) of the formula (I-3a)

$$F(CF_2CF_2)_l—(CH_2CH_2O)_c—H \qquad (I-3a)$$

where
l is 1 to 8, preferably 1 to 6, more preferably 2 to 3, and
c is 1 to 15, preferably 5 to 15.

Examples of suitable perfluoroalcohols are 3,3,4,4,5,5,6,6,7,7,8,8,8-tridecafluorooctan-1-ol, 3,3,4,4,5,5,6,6,7,7,8,8,9,9,10,10,10-heptadecafluoro-decan-1-ol, 3,3,4,4,5,5,6,6,7,7,8,8,9,9,10,10,11,11,12,12,12-heneicosafluorododecan-1-ol, 3,3,4,4,5,5,6,6,7,7,8,8,9,9,10,10,11,11,12,12,13,13,14,14,14-pentacosafluorotetradecan-1-ol, 3,3,4,4,5,5,6,6,7,7,8,8,9,9,10,10,11,11,12,12,13,13,14,14,15,15,16,16,16-nonacosafluorohexadecan-1-ol, 3,3,4,4,5,5,6,6,7,7,8,8-dodecafluoroheptan-1-ol, 3,3,4,4,5,5,6,6,7,7,8,8,9,9,10,10-hexadecafluorononan-1-ol, 3,3,4,4,5,5,6,6,7,7,8,8,9,9,10,10,11,11,12,12-eicosafluoroundecan-1-ol, 3,3,4,4,5,5,6,6,7,7,8,8,9,9,10,10,11,11,12,12,13,13,14,14-tetracosafluorotridecan-1-ol, and 3,3,4,4,5,5,6,6,7,7,8,8,9,9,10,10,11,11,12,12,13,13,14,14,15,15,16,16-octacosafluoropentadecan-1-ol.

With particular preference component (PF) has at least one perfluoroalkyl group of the formula (I-2)

$$CF_3—(CF_2)_k— \qquad (I-2)$$

in which k is 1 to 20, more particularly 3 to 11, very preferably 5 to 7.

These preferred structural units (I-2) are introduced preferably by reaction of—preferably aliphatic—polyisocyanates and/or the polyisocyanates derived therefrom by trimerization, dimerization, urethane formation, biuret formation, uretdione formation and/or allophanate formation with at least one (per)fluoroalkyl monoalcohol (FA) of the formula (I-2a)

$$CF_3—(CF_2)_k—(CH_2)_o—OH \qquad (I-2a)$$

or mixtures of different fluoroalcohols of the formula (I-2a), in which k is 1 to 8, preferably 1 to 6, more particularly 1 to 4, and o is 1 to 6, more particularly 1 to 4, and very preferably 1 to 2.

Very particular preference is given to using perfluoroalkylethanols of the formula (I-2a) where o is 2, preferably 2-(perfluorohexyl)ethanol and 2-(perfluorooctyl)ethanol, and to mixtures of different perfluoroalkylethanols of the formula (I-3a), more particularly a mixture of 2-(perfluorohexyl)ethanol and 2-(perfluorooctyl)ethanol, optionally together with other (per)fluoroalkylethanols. Used with preference are perfluoroalkylethanol mixtures with 30 to 49.9 wt % of 2-(perfluorohexyl)ethanol and 30 to 49.9 wt % of 2-(perfluorooctyl)ethanol, such as the commercial products Fluowet® EA 612 and Fluowet® EA 812; 2-(perfluorohexyl)ethanol, such as the commercial product Daikin A-1620, or 2-(perfluorooctyl)ethanol, such as the commercial product Daikin A-1820, from Daikin Industries Ltd., Osaka, Japan. Very particular preference is given to using 2-(perfluorohexyl)ethanol.

Furthermore, the urethane additive (PF) has preferably been prepared by the component (IIIa) used for preparing the urethane additive (PF) being selected from the group of primary monoalcohols, secondary monoalcohols, tertiary monoalcohols and/or secondary monoamines.

Examples of suitable monoalcohols are methanol, ethanol, propanol, butanol, pentanol, hexanol, heptanol, and octanol; examples of suitable secondary monoalcohols are 2-propanol, 2-butanol, 2-pentanol, and isoamyl alcohol; examples of suitable tertiary mono-alcohols are tert-butanol and tert-amyl alcohol.

Examples of suitable secondary monoamines are dimethyl-amine, diethylamine, dipropylamine, methylethylamine, 2-aminopentane, dibutylamine, N-methyloctylamine, diphenyl amine, phenylethylamine, piperidine, pyrrolidine, morpholine, and the like.

In the urethane additive (PF), preferably 95 to 100 mol %, more preferably 100 mol %, of the isocyanate groups originally present in the polyisocyanate (PI) have been reacted with components (Ia), (IIa), and optionally (IIIa).

The coating material composition comprises the urethane additive (PF) generally in an amount of 0.05 to 10.0 wt %, preferably of 0.1 to 5.0 wt %, based in each case on the binder fraction of the coating material composition.

The Combination of Components (A), (B), Optionally (C) and (PF) and Also Further Components of the Coating Material Compositions If the coating material compositions are one-component compositions, then polyisocyanate group-containing components (B) are selected whose free isocyanate groups are blocked with blocking agents. The isocyanate groups may be blocked, for example, with substituted pyrazoles, more particularly with alkyl-substituted pyrazoles, such as 3-methylpyrazole, 3,5-dimethylpyrazole, 4-nitro-3,5-dimethylpyrazole, 4-bromo-3,5-dimethylpyrazole, and the like. With particular preference the isocyanate groups of component (B) are blocked with 3,5-dimethylpyrazole.

The two-component (2K) coating material compositions that are particularly preferred in accordance with the invention are formed by the mixing, in a conventional way shortly before the coating material is applied, of a paint component comprising the polyhydroxyl group-containing component (A) and also further components, described below, with a further paint component comprising the polyisocyanate group-containing component (B), and also, optionally, further of the components described below, wherein generally the paint component which comprises component (A) comprises the urethane additive (PF) and part of the solvent.

The polyhydroxyl component (A) may be present in a suitable solvent. Suitable solvents are those which permit sufficient solubility of the polyhydroxyl component. Examples of such solvents are those solvents (L) already listed for the polyisocyanate group-containing component (B).

The weight fractions of the polyol (A) and optionally (C) and of the urethane additive (PF) and also of the polyisocyanate (B) are preferably selected such that the molar equivalents ratio of the hydroxyl groups of the polyhydroxyl group-containing component (A) plus optionally (C) to the isocyanate groups of component (B) is between 1:0.9 and 1:1.5, preferably between 1:0.9 and 1:1.1, more preferably between 1:0.95 and 1:1.05.

It is preferred in accordance with the invention for coating material compositions to be used that comprise from 30 to 75 wt %, preferably from 40 to 65 wt %, based in each case on the binder fraction of the coating material composition, of at least one polyhydroxyl group-containing component (A), more particularly of at least one polyhydroxyl group-containing polyacrylate (A) and/or of at least one polyhydroxyl group-containing polymethacrylate (A).

Likewise preferred is the use in accordance with the invention of coating material compositions which comprise from 20 to 50 wt %, preferably from 25 to 40 wt %, based in each case on the binder fraction of the coating material composition, of the polyisocyanate group-containing component (B).

Besides these, the coating materials of the invention may further comprise one or more amino resins (E).

Those contemplated are the customary and known amino resins, some of whose methylol and/or methoxymethyl groups may have been defunctionalized by means of carbamate groups or allophanate groups. Crosslinking agents of this kind are described in patent specifications U.S. Pat. No. 4,710,542 and EP-B-0 245 700, and also in the B. Singh and coworkers article "Carbamylmethylated Melamines, Novel Crosslinkers for the Coatings Industry" in Advanced Organic Coatings Science and Technology Series, 1991, volume 13, pages 193 to 207. Generally speaking, such amino resins (E) are used in proportions of 0 to 20 wt %, preferably of 0 to 15 wt %, based on the binder fraction of the coating material composition.

The coating material compositions of the invention preferably further comprise at least one customary and known coatings additive (F), different from components (A), (B), (D), optionally (C), optionally (E) and (PF), in effective amounts, i.e., in amounts preferably up to 20 wt %, more preferably from 0 to 10 wt %, based in each case on the binder fraction of the coating material composition.

Examples of suitable coatings additives (F) are as follows:
especially UV absorbers;
especially light stabilizers such as HALS compounds, benzotriazoles, or oxalanilides;
radical scavengers;
slip additives;
polymerization inhibitors;
defoamers;
reactive diluents different from components (A) and (C), more particularly reactive diluents which become reactive only on reaction with further constituents and/or water, such as Incozol or aspartic esters, for example;
wetting agents different from components (A) and (C), such as siloxanes, fluorine compounds, carboxylic monoesters, phosphoric esters, polyacrylic acids and copolymers thereof, or polyurethanes;
adhesion promoters;
flow control agents;
rheological assistants, based for example on customary hydrophilic and/or hydrophobic fumed silica, such as various Aerosil® grades, or customary urea-based rheological assistants;
film-forming auxiliaries such as cellulose derivatives;
fillers such as, for example, nanoparticles based on silicon dioxide, aluminum oxide, or zirconium oxide; for further details, refer to Rompp Lexikon "Lacke and Druckfarben", Georg Thieme Verlag, Stuttgart, 1998, pages 250 to 252;
flame retardants.

Particularly preferred are coating material compositions which comprise
40 to 65 wt %, based on the binder fraction of the coating material composition, of at least one polyhydroxyl group-containing polyacrylate (A) and/or of at least one polyhydroxyl group-containing polymethacrylate (A) and/or of at least one polyhydroxyl group-containing polyester polyol (A) and/or of a polyhydroxyl group-containing polyurethane (A),
25 to 40 wt %, based on the binder fraction of the coating material composition, of at least one component (B),
0 to 5 wt %, based on the binder fraction of the coating material composition, of the hydroxyl group-containing component (C),
0.1 to 8.0 wt %, based on the binder fraction of the coating material composition of the invention, of at least one urethane additive (PF),
0 up to 15 wt %, based on the binder fraction of the coating material composition, of at least one amino resin (E),
0.1 to 10 wt %, based on the binder fraction of the coating material composition of the invention, of at least one catalyst (D) for the crosslinking, and
0 to 10 wt %, based on the binder fraction of the coating material composition, of at least one customary and known coatings additive (F).

The binder fraction of the coating material composition as indicated in the context of the amounts of the individual components is made up in each case of the sum of the binder fraction of component (A) plus the binder fraction of component (B) plus the binder fraction of component (C) plus the binder fraction of component (PF) plus the binder fraction of component (E).

The coating materials of the invention are more particularly transparent coating materials, preferably clearcoats. The coating materials of the invention therefore comprise no pigments, or only organic transparent dyes or transparent pigments.

In a further embodiment of the invention, the binder mixture of the invention or the coating material composition of the invention may further comprise additional pigments and/or fillers and may serve for the production of pigmented topcoats or pigmented undercoats or surfacers, more particularly pigmented topcoats. The pigments and/or fillers employed for these purposes are known to the skilled person. The pigments are typically used in an amount such that the pigment-to-binder ratio is between 0.05:1 and 1.5:1, based in each case on the binder fraction of the coating material composition.

Since the coatings of the invention produced from the coating materials of the invention adhere outstandingly even to already-cured electrocoats, primer-surfacer coats, basecoats or customary and known clearcoats, they are outstandingly suitable, in addition to their use in automotive OEM (production-line) finishing, for automotive refinishing and/or for the coating of parts for installation in or on motor vehicles, and/or for the coating of commercial vehicles.

The application of the coating material compositions of the invention may take place by any of the customary application methods, such as, for example, spraying, knife-coating, spreading, pouring, dipping, impregnating, trickling or rolling. With respect to such application, the substrate to be coated may itself be at rest, with the application unit or equipment being moved. Alternatively, the substrate to be coated, more particularly a coil, may be moved, with the application unit being at rest relative to the substrate or being moved appropriately.

Preference is given to employing spray application methods, such as, for example, compressed air spraying, airless spraying, high speed rotation, electrostatic spray application (ESTA), alone or in conjunction with hot spray application such as hot air spraying, for example.

The curing of the applied coating materials of the invention may take place after a certain rest time. The rest time serves, for example, for the leveling and degassing of the coating films or for the evaporation of volatile constituents such as solvents. The rest time may be assisted and/or shortened through the application of elevated temperatures and/or through a reduced atmospheric humidity, provided that this does not entail any instances of damage to or change in the coating films, such as a premature complete crosslinking.

The thermal curing of the coating materials has no peculiarities in terms of method, but instead takes place in accordance with the customary and known methods, such as heating in a forced air oven or irradiation with IR lamps. This thermal curing may also take place in stages. Another preferred curing method is that of curing with near infrared (NIR radiation).

The thermal curing takes place advantageously at a temperature of 20 to 200° C., preferably 40 to 190° C. and more particularly 50 to 180° C., for a time of 1 min up to 10 h, preferably 2 min to 5 h and more particularly 3 min to 3 h, with longer cure times also being employable at low temperatures. For automotive refinishing and for the coating of plastics parts, and also for the coating of commercial vehicles, relatively low temperatures are typically employed here, of preferably between 20 and 80° C.

The coating materials of the invention are outstandingly suitable as decorative, protective and/or effect coatings and finishes on bodywork of means of transport (especially powered vehicles, such as cycles, motorcycles, buses, trucks or cars) or of parts thereof; on the interior and exterior of edifices; on furniture, windows and doors; on plastics moldings, especially CDs and windows; on small industrial parts, on coils, containers and packaging; on white goods; on films; on optical, electrical and mechanical components; and also on hollow glassware and articles of everyday use.

The coating material compositions of the invention can therefore be applied, for example, to an uncoated or pre-coated substrate, the coating materials of the invention being either pigmented or unpigmented. The coating material compositions and paint systems of the invention in particular, more particularly the clearcoats, are employed in the technologically and esthetically particularly demanding field of automotive OEM finishing and for the coating of plastics parts for installation in or on car bodies, more particularly for top-class car bodies, such as, for example, for producing roofs, hatches, hoods, fenders, bumpers, spoilers, sills, protective strips, side trim and the like, and for the finishing of commercial vehicles, such as, for example, of trucks, chain-driven construction vehicles, such as crane vehicles, wheel loaders and concrete mixers, buses, rail vehicles, watercraft, aircraft, and also agricultural equipment such as tractors and combines, and parts thereof, and also for automotive refinishing, with automotive refinishing encompassing not only the repair of the OEM finish on the line but also the repair of local defects, such as scratches, stone chip damage and the like, for example, and also complete recoating in corresponding repair workshops and car paint shops for the value enhancement of vehicles.

The plastics parts are typically composed of ASA, polycarbonates, blends of ASA and polycarbonates, polypropylene, polymethyl methacrylates or impact-modified polymethyl methacrylates, more particularly of blends of ASA and polycarbonates, preferably used with a polycarbonate fraction>40%, more particularly >50%. ASA refers generally to impact-modified styrene/acrylonitrile polymers, in which graft copolymers of vinylaromatic compounds, more particularly styrene, and of vinyl cyanides, more particularly acrylonitrile, are present on polyalkyl acrylate rubbers in a copolymer matrix of, in particular, styrene and acrylonitrile.

With particular preference, the coating material compositions of the invention are used in multistage coating processes, more particularly in processes in which an optionally precoated substrate is coated first with a pigmented basecoat film and then with a film with the coating material composition of the invention. The invention accordingly also provides multicoat color and/or effect finishes comprising at least one pigmented basecoat and at least one clearcoat applied thereon, these finishes being characterized in that the clearcoat has been produced from the coating material composition of the invention.

Not only water-thinnable basecoats but also basecoats based on organic solvents can be used. Suitable basecoats are described in, for example, EP-A-0 692 007 and in the documents listed therein at column 3 lines et seq. Preferably, the applied basecoat is first dried—that is, in an evaporation phase, at least some of the organic solvent and/or of the water is removed from the basecoat film. Drying takes place preferably at temperatures from room temperature to 80° C. After drying has taken place, the coating material composition of the invention is applied. The two-coat finish is subsequently baked, preferably under conditions employed in automotive OEM finishing, at temperatures from 20 to 200° C. for a time of 1 min up to 10 h; in the case of the temperatures employed for automotive refinishing, which in general are between 20 and 80° C., longer cure times may also be employed.

In another preferred embodiment of the invention, the coating material composition of the invention is used as a transparent clearcoat for the coating of plastics substrates, particularly of plastics parts for interior or exterior installation. These plastics parts for interior or exterior installation are preferably coated likewise in a multistage coating process, in which an optionally precoated substrate or a substrate which has been pretreated for enhanced adhesion of the subsequent coatings (by means, for example, of flaming, corona treatment or plasma treatment of the substrate) is coated first with a pigmented basecoat film and thereafter with a film with the coating material composition of the invention.

EXAMPLES

Preparation of a Polyacrylate Polyol (A1)

A reactor which has been flushed with nitrogen and on which there is a condenser mounted is charged with 589.25 parts by weight of Solventnaphta® and this initial charge is heated to 140° C. with stirring. In parallel to this, two separate feeds were prepared. Feed 1 consisted of 340.75 parts by weight of cyclo-hexyl methacrylate, 262.00 parts by weight of styrene, 209.25 parts by weight of n-butyl methacrylate, 235.75 parts by weight of 2-hydroxethyl methacrylate, and 262.00 parts by weight of hydroxypropyl methyacrylate. Feed 2 consisted of 61.00 parts by weight of Solventnaphta® and 130.75 parts by weight of peroxide TBPEH (tert-butyl peroxy-2-ethylhexanoate). When the temperature of 140° C. was reached, feed 2 was metered in slowly and uniformly over a period of 285 minutes. 15 minutes after the start of feed 2, feed 1 was metered into the reactor slowly and uniformly over a period of 240 minutes. After the end of the metering of feed 2, the reaction mixture was stirred at 140° C. for a further 120 minutes for postpolymerization. The polymerization solution is diluted with 409.25 g of methoxypropyl acetate. The binder fraction of the resulting product was found to be 55.15%, the acid number 1.5 mg KOH/g (based on the solids content), and the viscosity (at 23° C.) 650 mPa s. The theoretical OH number is 156 mg KOH/g.

Preparation of a Polyacrylate Polyol (A2)

A reactor which has been flushed with nitrogen and on which there is a condenser mounted is charged with 678.22 parts by weight of Solventnaphta® and this initial charge is heated to 140° C. with stirring. In parallel to this, two separate feeds were prepared. Feed 1 consisted of 335.73 parts by weight of cyclo-hexyl methacrylate, 258.28 parts by weight of styrene, 193.25 parts by weight of n-butyl methacrylate, 232.38 parts by weight of 2-hydroxethyl methacrylate, 12.83 parts by weight of acrylic acid, and 258.28 parts by weight of hydroxypropyl methyacrylate. Feed 2 consisted of 58.33 parts by weight of Solventnaphta® and 129.03 parts by weight of peroxide TBPEH (tert-butyl peroxy-2-ethylhexanoate). When the temperature of 140° C. was reached, feed 2 was metered in slowly and uniformly over a period of 285 minutes. 15 minutes after the start of feed 2, feed 1 was metered into the reactor slowly and uniformly over a period of 240 minutes. After the end of the metering of feed 2, the reaction mixture was stirred at 140° C. for a further 120 minutes for postpolymerization. The polymerization solution is diluted with a mixture of 146.60 g of butyl acetate and 196.70 g of solvent naphtha. The binder fraction of the resulting product was found to be 55.10%, the acid number 9.6 mg KOH/g (based on the solids content), and the viscosity (at 23° C.) 1120 mPa s. The theoretical OH number is 156 mg KOH/g.

Preparation of the Aerosil Paste (A3)

A laboratory stirrer mill from Vollrath is charged with 800 g of millbase, consisting of 656 g of polyacrylate A2, 74.4 g of butyl acetate, and 69.6 g of Aerosil® R380 (Evonik Industries AG, Hanau—BET surface area=380±30 m²/g), together with 110 g of silica sand (grain size 0.70±0.1 mm), and dispersion takes place for 30 minutes with water cooling. Following dispersion, separation was carried out to remove the grinding media.

Preparation of the Fluorine-Containing Components (PF1) to (PF6) and of the Components (PFV1) to (PFV2)

100 g of a commercial isocyanurate of hexamethylene diisocyanate (Desmodur® N3300, Bayer Materials Science AG) are introduced into a 500 ml three-neck flask. The apparatus is fitted with a KPG blade stirrer, a dropping funnel, and a gas supply fitting for the introduction of dry nitrogen. The isocyanate is diluted with the quantity of Solventnaphta® indicated in table 1, and the solution is heated to 70° C. Next, X mol % of the NCO groups are reacted with the quantity as indicated in table 1 of the monofunctional fluoro-alcohol as likewise indicated in table 1. When the theoretical NCO value is reached, 20 mol % of the remaining NCO groups are reacted with pentanol. When again the theoretical NCO value is reached, the remaining NCO groups are reacted with the mixture as indicated in table 1 of bis[3-(trimethoxysilyl)propyl]-amine (commercial product Dynasylan® 1124 from Evonik) and N-[3-(trimethoxysilyl)propyl]butylamine (Dynasylan® 1189 from Evonik). When the NCO of 0% is reached, the product mixture is cooled and the solids content is ascertained (all batches are calculated on the basis of an SC of 60%).

Curing Agent Solution (B)

To prepare the curing agent solution, a suitable vessel is charged with 13.5 parts of a commercial isophorone diisocyanate (70% strength in Solventnaphta®), 69.5 parts of a commercial isocyanurate of hexamethylene diisocyanate (90% strength in butyl acetate/Solventnaphta® 1:1), 8.5 parts of Solventnaphta®, and 8.5 parts of butyl acetate, and these components are intimately mixed with one another by stirring. The solids content (binder fraction) of the curing agent solution is 72.0%.

TABLE 1

Composition of components (PF1) to (PF6) and of components (PFV1) to (PFV2)

| | PFV1 | PFV2 | PF1 | PF2 | PF3 | PF4 | PF5 | PF6 |
|---|---|---|---|---|---|---|---|---|
| Desmodur ® N3300 (g) | 100 | 100 | 100 | 100 | 100 | 100 | 100 | 100 |
| NCO content (mol) | 0.546 | 0.546 | 0.546 | 0.546 | 0.546 | 0.546 | 0.546 | 0.546 |
| Solventnaphta ® (g) | 160.2 | 154.2 | 141.6 | 144 | 161.8 | 155.9 | 157.7 | 161 |
| 2,2,3,3,4,4,4-Heptafluoro-1-butanol (g) | — | — | 4.37 | — | — | — | — | — |
| A1620 (g) | — | 7.96 | — | 7.96 | 7.96 | 7.96 | 15.92 | 3.98 |
| Residual NCO content after addition of fluoroalcohol (mol) | 0.546 | 0.525 | 0.525 | 0.525 | 0.525 | 0.525 | 0.503 | 0.536 |
| Pentanol (g) | 9.63 | 46.24 | 9.25 | 9.25 | 9.25 | 9.25 | 8.86 | 9.44 |
| Pentanol (mol) | 0.109 | 0.525 | 0.105 | 0.105 | 0.105 | 0.105 | 0.101 | 0.107 |

TABLE 1-continued

Composition of components (PF1) to (PF6) and of components (PFV1) to (PFV2)

| | PFV1 | PFV2 | PF1 | PF2 | PF3 | PF4 | PF5 | PF6 |
|---|---|---|---|---|---|---|---|---|
| Residual NCO content after addition of pentanol (mol) | 0.437 | 0 | 0.420 | 0.420 | 0.420 | 0.420 | 0.402 | 0.428 |
| Dynasylan ® 1124 (g) | 89.57 | — | — | — | 85.99 | 57.33 | 54.94 | 87.78 |
| Dynasylan ® 1189 (g) | 41.16 | — | 98.78 | 98.78 | 39.51 | 59.27 | 56.80 | 40.33 |
| NCO groups reacted with fluoroalcohol, in mol % | — | 4 | 4 | 4 | 4 | 4 | 8 | 2 |
| NCO groups reacted with silane in mol % | 80 | — | 76.8 | 76.8 | 76.8 | 76.8 | 73.6 | 78.4 |
| Bissilane/monosilane mixing ratio in mol % | 60/40 | — | 0/100 | 0/100 | 60/40 | 40/60 | 40/60 | 60/40 |
| Binder fraction of component PF in wt % | 60 | 60 | 60 | 60 | 60 | 60 | 60 | 60 |

Formulation of the Coating materials of Inventive Examples B1 to B6 and of the Coating Materials of Comparative Examples V1 to V2, and also of the Corresponding Coatings of Examples 1 to 6 and of Comparative Examples V1 to V2

To produce the base varnishes (S1), (S2), (S3), (S4), (S5), and (S6) of the inventive examples and the base varnishes (VS1) and (VS2) of the comparative examples, the constituents indicated in table 2 are weighed out in the order stated (beginning from the top) into a suitable vessel, in this order, and mixed intimately with one another by stirring.

TABLE 2

Composition of base varnishes S1 to S6 and VS1 to VS2 in parts by weight

| Component | (VS1) | (VS2) | (S1) | (S2) | (S3) | (S4) | (S5) | (S6) |
|---|---|---|---|---|---|---|---|---|
| (A1) [parts by weight] | 35 | 35 | 35 | 35 | 35 | 35 | 35 | 35 |
| (A2) [parts by weight] | 26 | 26 | 26 | 26 | 26 | 26 | 26 | 26 |
| Setalux ® 91756[1] [parts by weight] | 13 | 13 | 13 | 13 | 13 | 13 | 13 | 13 |
| Paste A3[2] [parts by weight] | 2 | 2 | 2 | 2 | 2 | 2 | 2 | 2 |
| Cymel ® 202[3] [parts by weight] | 8 | 8 | 8 | 8 | 8 | 8 | 8 | 8 |
| TINUVIN ® 384[4] [parts by weight] | 1.1 | 1.1 | 1.1 | 1.1 | 1.1 | 1.1 | 1.1 | 1.1 |
| TINUVIN ® 292[5] [parts by weight] | 0.9 | 0.9 | 0.9 | 0.9 | 0.9 | 0.9 | 0.9 | 0.9 |
| Flow control agent[6] [parts by weight] | 0.15 | 0.15 | 0.15 | 0.15 | 0.15 | 0.15 | 0.15 | 0.15 |
| Butyl acetate [parts by weight] | 3.65 | 3.65 | 3.65 | 3.65 | 3.65 | 3.65 | 3.65 | 3.65 |
| Dipropylene glycol methyl ether [parts by weight] | 7 | 7 | 7 | 7 | 7 | 7 | 7 | 7 |
| Butanol [parts by weight] | 1 | 1 | 1 | 1 | 1 | 1 | 1 | 1 |
| Solventnaphta ® [parts by weight] | 2.2 | 2.2 | 2.2 | 2.2 | 2.2 | 2.2 | 2.2 | 2.2 |
| PFV1[7] [parts by weight] | 1.00 | | | | | | | |
| PFV2[7] [parts by weight] | | 1.00 | | | | | | |
| PF1[7] [parts by weight] | | | 1.00 | | | | | |
| PF2[7] [parts by weight] | | | | 1.00 | | | | |
| PF3[7] [parts by weight] | | | | | 1.00 | | | |
| PF4[7] [parts by weight] | | | | | | 1.00 | | |
| PF5[7] [parts by weight] | | | | | | | 1.00 | |
| PF6[7] [parts by weight] | | | | | | | | 1.00 |
| Amount of additive PF (SC) in wt %, based on binder fraction of base varnish | 1.2 | 1.2 | 1.2 | 1.2 | 1.2 | 1.2 | 1.2 | 1.2 |

Key to table 2:
[1] Setalux ® 91756 = commercial rheological agent from Nuplex Resins, Netherlands, urea-based, in solution/dispersion in a polyacrylate binder, with a nonvolatile fraction of 60 wt %
[2] above-described paste A3 of Aerosil ®
[3] Cymel ® 202 = commercial melamine resin from Cytec, 82% strength in bultanol
[4] Tinuvin ® 384 = commercial light stabilizer based on a benzotriazole, from BASF SE
[5] Tinuvin ® 292 = commercial light stabilizer based on a sterically hindered amine, from BASF SE
[6] commercial, polyether-modified polymethylalkyl-siloxane
[7] used in each case is 1 part by weight of the 60% strength component PF For producing the coating materials (KL) of the inventive examples B1 to B6 and the coating materials of the comparative examples V1 to V2, the constituents indicated in table 3 are weighed out in the order stated (starting from the top) into a suitable vessel in this order and are intimately mixed with one another by stirring.

The hardness of each of the resulting coatings is ascertained. All coatings are notable for good hardness.

Thereafter a cross-cut is made in accordance with the standard DIN EN ISO 2409 DE, and an adhesion test is carried out with adhesive tape removal. The test results are likewise set out in table 4.

TABLE 3

Composition of the coating materials of examples B1 to B6 and of the comparative examples V1 to V2 in parts by weight (at a mixing ratio of 100 parts by weight of base varnish to 36 parts by weight of curing agent)

|  | Comp. V1 | Comp. V2 | B1 | B2 | B3 | B4 | B5 | B6 |
|---|---|---|---|---|---|---|---|---|
| Base varnish (VS1) | 100 | | | | | | | |
| Base varnish (VS2) | | 100 | | | | | | |
| Base varnish (S1) | | | 100 | | | | | |
| Base varnish (S2) | | | | 100 | | | | |
| Base varnish (S3) | | | | | 100 | | | |
| Base varnish (S4) | | | | | | 100 | | |
| Base varnish (S5) | | | | | | | 100 | |
| Base varnish (S6) | | | | | | | | 100 |
| Curing agent solution (B) | 36 | 36 | 36 | 36 | 36 | 36 | 36 | 36 |
| Binder fraction in total paint in wt % | 55.0 | 55.0 | 55.0 | 55.0 | 55.0 | 55.0 | 55.0 | 55.0 |
| Amount of PF (SC) in wt %, based on binder fraction of complete varnish | 0.8 | 0.8 | 0.8 | 0.8 | 0.8 | 0.8 | 0.8 | 0.8 |

Bonder panels of metal are coated in succession with a commercial electrocoat material (CathoGuard® 500 from

TABLE 4

Test results of the coatings of examples B1 to B6 and of comparative examples V1 to V2

|  | Comp. V1 | Comp. V2 | B1 | B2 | B3 | B4 | B5 | B6 |
|---|---|---|---|---|---|---|---|---|
| Cross-cut | Gt 5 | Gt 5 | Gt 2 | Gt 2 | Gt 3 | Gt 3 | Gt 3-4 | Gt 4 |
| Amount of PF in complete varnish, based on binder fraction of complete varnish, in wt % | 0.8 | 0.8 | 0.8 | 0.8 | 0.8 | 0.8 | 0.8 | 0.8 |
| NCO groups reacted with fluoroalcohol in PF, in mol % | 0 | 4 | 4 | 4 | 4 | 4 | 8 | 2 |
| Amount of fluoroalcohol in PF in wt % (based on solution PF) | 0 | 3.1 | 1.2 | 2.2 | 2.0 | 2.0 | 4.0 | 1.0 |
| Amount of fluoroalcohol in PF in wt % (based on SC PF) | 0 | 5.2 | 2.1 | 3.7 | 3.3 | 3.4 | 6.7 | 1.6 |
| Amount of fluoroalcohol in complete varnish[1], based on binder fraction, in wt % | — | 0.025 | 0.009 | 0.018 | 0.016 | 0.016 | 0.032 | 0.008 |
| NCO groups reacted with silane in PF, in mol % | 80 | — | 76.8 | 76.8 | 76.8 | 76.8 | 73.6 | 78.4 |
| Bissilane/monosilane mixing ratio in mol % | 60/40 | — | 0/100 | 0/100 | 60/40 | 40/60 | 40/60 | 60/40 |

Key to table 4:
[1] Calculated from fraction of PF in base varnish, multiplied by amount of F-alcohol in the additive PF.

BASF Coatings GmbH) and with a commercial water-based surfacer (SecuBloc® from BASF Coatings GmbH) and baked in each case. Coating then takes place with commercial black waterborne basecoat material (ColorBrite® from BASF Coatings GmbH), with drying at 80° C. for 7 minutes. The coating materials of examples B1 to B6 and of comparative examples V1 to V2 are then applied using a gravity-fed cup-type gun. Following application, the varnish system is baked three times at 135° C. over a time of 20 minutes in each case.

What is claimed is:

1. A nonaqueous coating material composition, comprising
   at least one polyhydroxyl group-containing component (A),
   at least one polyisocyanate group-containing component (B),
   at least one catalyst (D), and
   at least one urethane additive (PF) which is different from component (B) and which comprises at least one perfluoroalkyl group of formula (I)

$$CR^1{}_3-(CR^2{}_2)_x- \qquad (I),$$

where
R$^1$ and R$^2$ independently are H, F and/or CF$_3$, with the proviso that R$^1$ and R$^2$ are not both H, and
x is 1 to 20, and
at least one silane group of formula (II)

$$-X-Si-R^3{}_sG_{3-s} \qquad (II)$$

where
G is independently a hydrolyzable group,
X is an organic radical,
R$^3$ is alkyl, cycloalkyl, aryl, or aralkyl, wherein the carbon chain is optionally interrupted by nonadjacent oxygen, sulfur, or NRa groups, where Ra is alkyl, cycloalkyl, aryl or aralkyl,
s is 0 to 2,
wherein the urethane additive (PF) is prepared by reacting
0.5 to 20.0 mol % of isocyanate groups originally present in at least one polyisocyanate (PI) with a component (Ia) which has at least one perfluoroalkyl group of the formula (I) and one group reactive toward the isocyanate groups,
30.0 to 98.5 mol % of the isocyanate groups originally present in the polyisocyanate (PI) with a component (IIa) which is different from the component (Ia) and which has at least one silane group of the formula (II) and one group reactive toward the isocyanate groups, and
1.0 to 69.5 mol % of the isocyanate groups originally present in the polyisocyanate (PI) with a monofunctional component (IIIa) which is different from components (Ia) and (IIa) and which is reactive toward the isocyanate groups.

2. The coating material composition as claimed in claim 1, wherein in the formula (I)
x is 3 to 11, and
in the formula (II)
G is independently halogen, alkoxy group, alkylcarbonyl group, or acyloxy group,
X is linear or branched alkylene or cycloalkylene radical having 1 to 20 carbon atoms,
R$^3$ is alkyl radical, and
s is 0 to 1.

3. The coating material composition as claimed in claim 1, wherein the urethane additive (PF) is prepared by reacting
1.0 to 16.0 mol % of the isocyanate groups originally present in the polyisocyanate (PI) with the component (Ia),
64.0 to 89.0 mol % of the isocyanate groups originally present in the polyisocyanate (PI) with the component (IIa), and
10.0 to 30.0 mol % of the isocyanate groups originally present in the polyisocyanate (PI) with the component (Ma).

4. The coating material composition as claimed in claim 1, wherein the component (IIIa) is at least one selected from the group consisting of a primary monoalcohol, a secondary monoalcohol, a tertiary monoalcohol, and a secondary monoamine.

5. The coating material composition as claimed in claim 1, wherein, in the urethane additive (PF), 95 to 100 mol % of the isocyanate groups originally present in the polyisocyanate (PI) are reacted with the component (Ia), the component (IIa), and optionally a component (Ma).

6. The coating material composition as claimed in claim 1, wherein the component (IIa) comprises:

one or more aminosilanes of formula (IIa-1)

$$H-NR^4{}_t-[X-Si-R^3{}_sG_{3-s}]_{2-t} \qquad (IIIa-1),$$

where
X, R$^3$, G, and s have the same definition given for the formula (II),
R$^4$ is hydrogen, alkyl, cycloalkyl, aryl, or aralkyl, wherein the carbon chain is optionally interrupted by nonadjacent oxygen, sulfur, or NRa groups, where Ra is alkyl, cycloalkyl, aryl, or aralkyl, and t is 0 or 1; or
a mixture of at least one compound of formula (IIa-2) and at least one compound of formula (IIa-3)

$$H-NR^4-(X-SiR^3{}_s(OR^5)_{3-s}) \qquad (IIa-2)$$

$$HN(X-SiR^3{}_u(OR^5)_{3-u})_n(X'-SiR^{3'}{}_w(OR^{5'})_{3-w})_m \qquad (IIa-3),$$

where
R$^3$, R$^4$, and s have the same definition given for the formula (IIa-1),
R$^5$ and R$^{5'}$ are hydrogen, alkyl, or cycloalkyl, wherein the carbon chain is optionally interrupted by nonadjacent oxygen, sulfur, or NRa groups, where Ra is alkyl, cycloalkyl, aryl, or aralkyl,
X and X' are linear and/or branched alkylene or cycloalkylene radical having 1 to 20 carbon atoms,
n is 0 to 2, m is 0 to 2, m+n is 2, and u and w are 0 to 2.

7. The coating material composition as claimed in claim 6, wherein the component (IIa) comprises a mixture of
100 to 5 mol %, based on a total amount of the compounds (IIa-2) and (IIa-3), of the at least one compound of the formula (IIa-2); and
0 to 95 mol %, based on the total amount of the compounds (IIa-2) and (IIa-3), of the at least one compound of the formula (IIa-3).

8. The coating material composition as claimed in claim 1, wherein the component (Ia) is a fluoroalcohol of formula (Ia-1)

$$CR^1{}_3-(CR^2{}_2)_x-(CH_2)_y-O-A_z-H \qquad (Ia-1),$$

where
R$^1$ and R$^2$ independently are H, F and/or CF$^3$, with the proviso that R$^2$ are not simultaneously H,
x is 1 to 20,
y is 1-6,
z is 0-100,
A is CR'R"—CR'"R""—O or (CR'R")$_a$—O or CO—(CR'R")$_b$—O,
R', R", R'", and R"" independently are H, alkyl, cycloalkyl, aryl, any organic radical having 1 to 25 C atoms, and
a and b are 3-5.

9. The coating material composition as claimed in claim 1, wherein the polyisocyanate (PI) is at least one selected from the group consisting of an aliphatic polyisocyanate, a cycloaliphatic polyisocyanate, and a polyisocyanate obtained from trimerization, dimerization, urethane formation, biuret formation, uretdione formation, or allophanate formation.

10. The coating material composition as claimed in claim 1, comprising the urethane additive (PF) in an amount of 0.05 to 10.0 wt %, based on a binder fraction of the coating material composition.

11. The coating material composition as claimed in claim 1, wherein the at least one polyhydroxy group-containing component (A) is a polyol, which has an OH number of 30 to 400 mg KOH/g and is selected from the group consisting of a polyester polyol, a polyurethane polyol, a polysiloxane polyol, a polyacrylate polyol, a polymethacrylate polyol, or a mixture thereof.

12. A method for producing a multicoat paint system, the method comprising:
   applying a pigmented basecoat film to an optionally precoated substrate and
   thereafter applying a film comprising the coating material composition as claimed in claim 1.

13. A clearcoat material for automotive original equipment manufacturer (OEM) finishing, finishing of parts for installation in or on automobiles and/or utility vehicles, and automotive refinish, comprising
   the coating material composition as claimed in claim 1.

14. A multicoat effect and/or color paint system, comprising
   at least one pigmented basecoat and
   at least one clearcoat disposed thereon,
   wherein the clearcoat is produced from the coating material composition as claimed in claim 1.

15. A method for coating an article, the method comprising:
   finishing coating the article by applying the coating material composition as claimed in claim 1 to the article,
   wherein the article is a part for installation in or on automobiles and/or utility vehicles, or is a automobile or utility vehicle.

* * * * *

UNITED STATES PATENT AND TRADEMARK OFFICE
CERTIFICATE OF CORRECTION

PATENT NO. : 10,519,341 B2
APPLICATION NO. : 15/526843
DATED : December 31, 2019
INVENTOR(S) : Guenter Klein et al.

It is certified that error appears in the above-identified patent and that said Letters Patent is hereby corrected as shown below:

In the Specification

Column 2, Line 5, "-OCH$_2$C$_n$F$_{2+1}$" should read -- -OCH$_2$C$_n$F$_{2n+1}$ --;
    Line 15, "isocyanatofunctional" should read -- isocyanato functional --.

Column 9, Line 52, "group (O R$^5$)," should read -- group (OR$^5$), --.

Column 10, Line 24, "(IIIc)" should read -- (IIIa) --.

Column 11, Line 47, "formula (IIa):" should read -- formula (IIa-3): --;
    Line 49, "(I)" should read -- (IIa-2), --.

Column 12, Line 47, "to 80 mol %," should read -- 0 to 80 mol %, --.

Column 13, Line 60, "CF$_3$-(CF$_2$)$_k$-(I-2)" should read -- CF$_3$-(CF$_2$)$_k$-     (I-2) --.

Column 14, Line 39, "diphenyl amine," should read -- diphenylamine, --.

Column 18, Line 41, "3 lines et seq." should read -- 3 lines 50 et seq. --.

In the Claims

Column 25, Claim 3, Line 55, "(Ma)." should read -- (IIIa). --.

Column 25, Claim 5, Line 65, "(Ma)." should read -- (IIIa). --.

Column 26, Claim 6, Line 3, "(IIIa-1)," should read -- (IIa-1), --.

Column 26, Claim 6, Line 14, "H-NR$^4$-(X-SiR$^3_s$(OR$^5$)$_{3-s}$)        (IIa-2)" should read -- H-NR$^4$-(X-SiR$^3_s$(OR$^5$)$_{3-s}$)     (IIa-2), --.

Signed and Sealed this
Thirtieth Day of June, 2020

Andrei Iancu
*Director of the United States Patent and Trademark Office*